United States Patent
Lewis

(10) Patent No.: US 8,588,101 B2
(45) Date of Patent: *Nov. 19, 2013

(54) METHOD AND ARRANGEMENT FOR REDUCING THE AVERAGE TIME NEEDED FOR A COMMUNICATION UNIT TO CONNECT TO A COMMUNICATION NETWORK

(75) Inventor: Michael Lewis, Marsta (SE)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,547

(22) Filed: Jan. 23, 2012

(65) Prior Publication Data

US 2012/0120836 A1 May 17, 2012

Related U.S. Application Data

(63) Continuation of application No. 11/313,547, filed on Dec. 20, 2005, now Pat. No. 8,102,824, and a continuation of application No. PCT/SE2004/000979, filed on Jun. 17, 2006.

(30) Foreign Application Priority Data

Jun. 24, 2003 (SE) ...................................... 0301835

(51) Int. Cl.
 *H04W 24/02* (2009.01)
(52) U.S. Cl.
 USPC ........ 370/252; 370/338; 370/346; 455/426.2; 455/507

(58) Field of Classification Search
 USPC ......... 370/338, 270, 310, 328, 445, 331, 342, 370/346; 342/159, 192, 195, 196, 52; 455/434, 432, 512, 513, 514, 524, 436, 455/442, 450; 709/206
 See application file for complete search history.

(56) References Cited

U.S. PATENT DOCUMENTS

| | | | |
|---|---|---|---|
| 7,406,315 B2 * | 7/2008 | Uhlik et al. | 455/452.1 |
| 7,412,486 B1 * | 8/2008 | Petrack et al. | 709/206 |
| 7,903,620 B2 * | 3/2011 | Rudolf et al. | 370/338 |
| 8,452,294 B2 * | 5/2013 | Laroia et al. | 455/450 |
| 2003/0107512 A1 * | 6/2003 | McFarland et al. | 342/159 |

OTHER PUBLICATIONS

Of Velayos et al, Techniques to reduce IEEE 802.11b MAC Layer handover time, 2003.*

* cited by examiner

*Primary Examiner* — Habte Mered
*Assistant Examiner* — Vincelas Louis
(74) *Attorney, Agent, or Firm* — SpryIP, LLC

(57) ABSTRACT

Described herein are techniques related to data communications using a data packet having at least one frame with a robust preamble for use over media having a high degree of non-stationary noise (e.g., impulsive noise). The described techniques employ a preamble with a structure having multiple transitions between the preamble sections. Each transition indicates the start of the upcoming frame. With the techniques described herein, if noise damages the transitions between such sections beyond recognition, the receiver can still determine the frame start time from the one or more of the undamaged transitions. Thus, the robustness of communications via the noisy media is significantly increased.

14 Claims, 5 Drawing Sheets

METHOD AND ARRANGEMENT FOR REDUCING THE AVERAGE TIME NEEDED FOR A COMMUNICATION UNIT TO CONNECT TO A COMMUNICATION NETWORK

RELATED APPLICATION

This application is a Continuation Application of co-pending application Ser. No. 11/313,547, which was filed on Dec. 20, 2005. The co-pending Application was a Continuation Application of International Application No. PCT/SE2004/000979 filed Jun. 17, 2004 which designates the United States, and claims priority to Sweden application number SE 0301835-5 filed Jun. 24, 2003. The entire content of each of the prior filed Applications is incorporated herein by reference.

BACKGROUND

The release of the 5 GHz bands for use by WLAN systems has offered a large number of new channels. However, there are requirements on users to not transmit data on these channels until they have checked that they are not being used by primary users, i.e. radar systems, by performing signal strengths measurements on the channels for at least 60 seconds.

Fortunately, it is not necessary for every WLAN terminal to perform such measurements. In the case of a mobile station connecting to an access point, it is possible to allow the access point to take care of checking for radar transmissions. In this case, a station that is to begin operation only need to find a channel, on which transmissions are ongoing to or from an access point, in order to be able to begin transmitting, i.e. to send a probe response to determine the nature of the WLAN, and attempt to associate if desired. To detect the presence of an access point on a channel, it is necessary to listen for transmissions on the channels.

An access point in a WLAN network typically transmits a so-called beacon frame approximately every 100 ms. However, to wait for 100 ms in each channel leads potentially to an unacceptable length of time to find an access point, with which one can associate. In ad-hoc or peer-to-peer networks, i.e. networks without an access point, responsibility for detecting radar systems is distributed to all stations in the network, and responsibility for generating beacons is shared.

As a compromise, it has been proposed to wait a shorter period of time and look for any traffic, i.e. beacon frames or other traffic, in a channel to determine whether it is occupied. This makes the situation reasonable in a busy enterprise network, where there is a reasonably high traffic level and a large number of access points available for use.

However, in the home environment there may only be one access point to which the station can associate. It is also entirely possible that the station is the only user for that access point. In this case, waiting less than the full beacon period may actually make the situation worse, since there is a fairly large chance of missing the beacon transmission from one's home access point on each measurement, thereby necessitating another full sweep through all available channels. Similar problems may occur in smaller enterprise networks or in enterprise networks, where there is a moderate traffic level and/or only a smaller number of access points available for use.

SUMMARY

At least one implementation of the invention provides a method and an arrangement, respectively, for reducing the average time needed for a communication unit to connect to a communication network of the above kind, particularly in networks with few access points or in situations where the traffic is fairly low.

In one implementation, a method is disclosed for reducing the average time needed for a communication unit to connect to a communication network, wherein the communication unit has to listen for data transmissions on a plurality of communication channels and to identify one of the plurality of communication channels, on which an ongoing data transmission is detected, before being able to begin transmitting, the method comprising the steps of monitoring the time lapsed since last data transmission on the one of the plurality of communication channels was ended, and provided that a condition of low data traffic is detected corresponding to that no further data transmission on the one of the plurality of communication channels occurs during a given period of time since the last data transmission on the channel was ended, transmitting data on the channel in order to enable the communication unit to detect an ongoing data transmission.

The communication network can be a wireless local area network. The plurality of communication channels can be within a frequency band, which is used for transmissions by a primary user, and wherein data may be transmitted in one of the plurality of communication channels only after having checked that the frequency band of the one of the plurality of communication channels is not used for transmissions by the primary user. Beacon frames can be sent on the one of the plurality of communication channels at regular time intervals, and the given period of time is shorter than the regular time intervals. Beacon frames can be sent on the one of the plurality of communication channels approximately every 100 ms. The given period of time can be less than approximately 100 ms, preferably less than 50 ms, and most preferably less than 25 ms. The data transmitted in order to enable the communication unit to detect an ongoing data transmission can be comprised of a null data frame. The data transmitted in order to enable the communication unit to detect an ongoing data transmission can be sent to a broadcast address. The data transmitted in order to enable the communication unit to detect an ongoing data transmission can be sent from an access point in the communications network. The data transmitted in order to enable the communication unit to detect an ongoing data transmission can be sent from a mobile station connected in the communications network.

In another implementation, an arrangement is disclosed for reducing the average time needed for a communication unit to connect to a communication network, wherein the communication unit has to listen for data transmissions on a plurality of communication channels and to identify one of the plurality of communication channels, on which an ongoing data transmission is detected, before being able to begin transmitting, the arrangement comprising clock means for monitoring the time lapsed since last data transmission on the one of the plurality of communication channels was ended, and transmitting means for transmitting data on the channel in order to enable the communication unit to detect an ongoing data transmission, provided that a condition of low data traffic is detected corresponding to that no further data transmission on the one of the plurality of communication channels occurs during a given period of time since the last data transmission on the channel was ended.

The communication network can be a wireless local area network. The arrangement can be provided for sending beacon frames on the one of the plurality of communication channels at regular time intervals, the given period of time being shorter than the regular time intervals. The data transmitted in order to enable the communication unit to detect an ongoing data transmission can be comprised of a null data frame. An access point provided for transmitting and receiving data on the one of the plurality of communication channels, may comprise such an arrangement.

By adding functionality, to the access point for example, so that if no traffic has been sent for a given period of time, the access point transmits a null data frame, the situation described above can be avoided. Such null data frames are defined in the 802.11 WLAN standard, and can be sent to the broadcast address so that they will be received by all stations without being necessarily any stations associated. Any other allowed 802.11 frame type could be used, as long as it does not interfere with the operation of possible associated stations and can be recognized by stations searching for a network.

These null data frames will only be sent when there is very light traffic and will thereby not represent any significant impact on the throughput of the WLAN cell or give a significant collision risk. The given time period, at the end of which a null data frame is sent, is less, preferably considerably less, than the time between two beacon frames, i.e. 100 ms. The time period may e.g. be less than 50 ms or 25 ms. When connecting to a network with such behavior it is possible to set the listening time on a particular channel to a very low level only marginally greater than the time period between scheduled null data frames, with virtually no risk of missing the transmission, which thereby allows for very short channel sweep times.

It shall be appreciated that the present invention has not necessarily to be implemented in the access point of the network. In ad-hoc networks, responsibility for generating the null data frames can be shared in the same way as the responsibility for generating beacons is shared. Yet alternatively, the invention may be implemented in any other kind of network node being capable of transmitting and receiving on the network.

It shall further be appreciated that the present invention is not restricted for use in a WLAN system using the 5 GHz bands concurrently with radar systems, but may be implemented in any kind of network, wherein a communication unit that is to connect to the communications network has to listen for data transmissions on a plurality of communication channels and to identify one of the communication channels on which an ongoing data transmission is detected, before being able to begin transmitting, in order to reduce the average time needed for the communication unit to connect to the network.

Further characteristics of the invention, and advantages thereof, will be evident from the following detailed description of preferred embodiments of the present invention given hereinafter and from the accompanying FIGS. 1-5, which are given by way of illustration only, and shall thus not limit the scope of the present invention.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Figure 1:
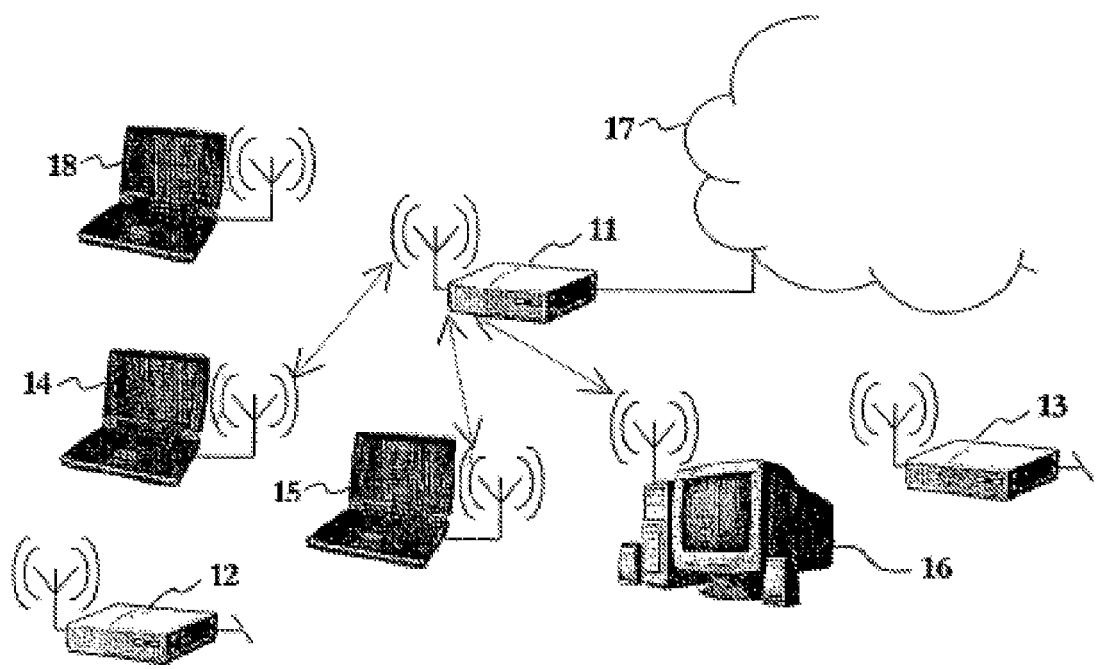
FIG. 1 is a schematic network layout for a WLAN, wherein the present invention is implemented.

In FIG. 1 a network layout for a WLAN is schematically shown, wherein a preferred embodiment of the present invention is implemented. The WLAN includes a plurality of network nodes or access points 11, 12, 13, which are connected to a general network such as e.g. the Internet 17. Each of the access points 11, 12, 13, transmits and receives on a fixed channel among those defined in the standard used in the WLAN, and each mobile station that is to connect to the WLAN has to associate with one of the access points 11, 12, 13.

In FIG. 1 three mobile stations 14, 15, 16 are connected to the WLAN, of which all are associated with the access point 11, i.e. they are capable of transmitting and receiving data on the channel allocated to the access point 11 as schematically indicated by the bi-directional arrows.

A fourth mobile station 18 is to connect to the WLAN and has therefore to listen for data transmissions on the channels, and to identify one of the channels, on which an ongoing data transmission is detected, before being able to begin transmitting. Typically, the mobile station 18 has to scan over the possible channels since only one channel at a time can be listened to.

Figure 3:
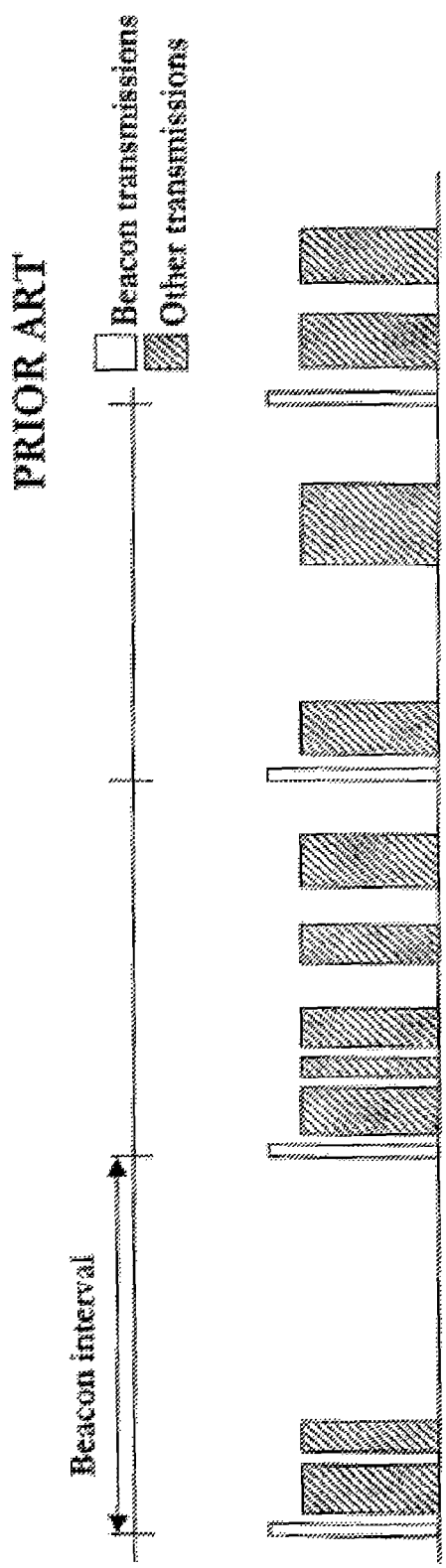
FIG. 3 is a schematic traffic time sequence on a channel according to prior art.

Each of the access points 11, 12, 13 sends out beacon frames on its respective allocated channel at regular time intervals, so-called beacon intervals, which typically are 100 ms. In FIG. 3 a schematic traffic time sequence is shown for the channel allocated to access point 11 of the WLAN of FIG. 1 as it would have appeared if the present invention would not have been implemented. The sequence shows beacon transmissions at the fixed beacon intervals and other transmissions, e.g. transmissions from the mobile stations 14, 15, and 16 more irregularly.

Thus, the mobile station 18 would have to listen to each channel a full beacon interval to avoid the risk of missing any channel that it would be capable to associate with. The time needed for identifying a channel to associate with may in cases with very few available access points and/or very low ongoing traffic be very long.

Figure 4:
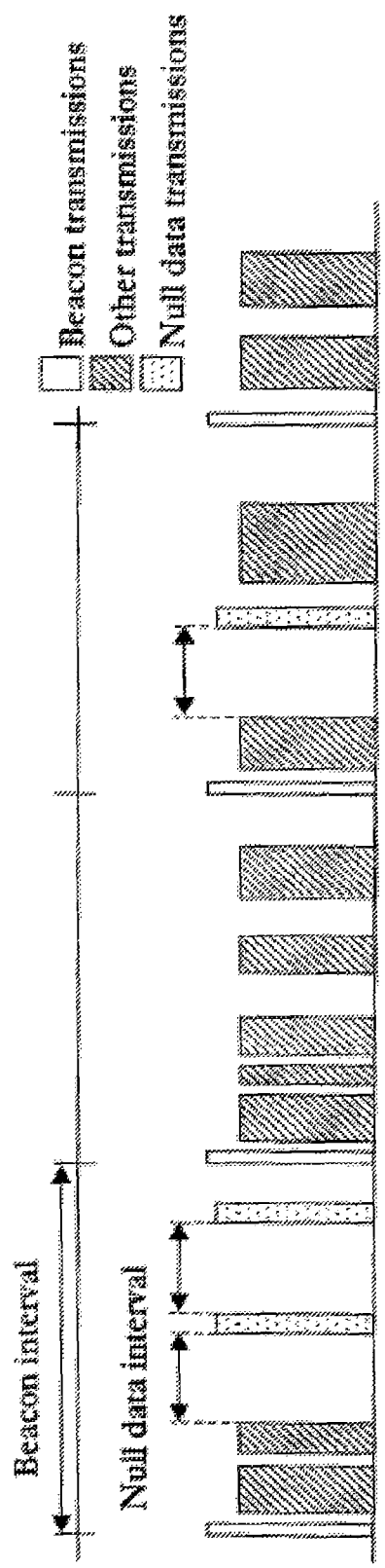
FIG. 4 is a schematic traffic time sequence on a channel according to a preferred embodiment of the present invention.

The present invention reduces this time needed by way of transmitting null data frames on a usable channel, which has been quiet for a certain time period. The access point 11 monitors the time lapsed since last data transmission on its allocated channel was ended, and provided that no further data transmission on the channel occurs during a given time period since the last data transmission on the channel was ended, also referred to as null data interval, it transmits a null data frame on the channel. In FIG. 4 a schematic traffic time sequence is shown for the channel allocated to access point 11 of the WLAN of FIG. 1 with the present invention implemented.

The null data interval is considerably shorter than the beacon interval, but yet sufficiently long not to heavily reduce the throughput on the channel. The null data interval is preferably shorter than 50 ms or shorter than 25 ms.

If the worst case search time must be kept within a particular bound, then the maximum allowable null data interval can be determined as the maximum allowed search time divided by the number of channels, which must be searched.

Figure 5:
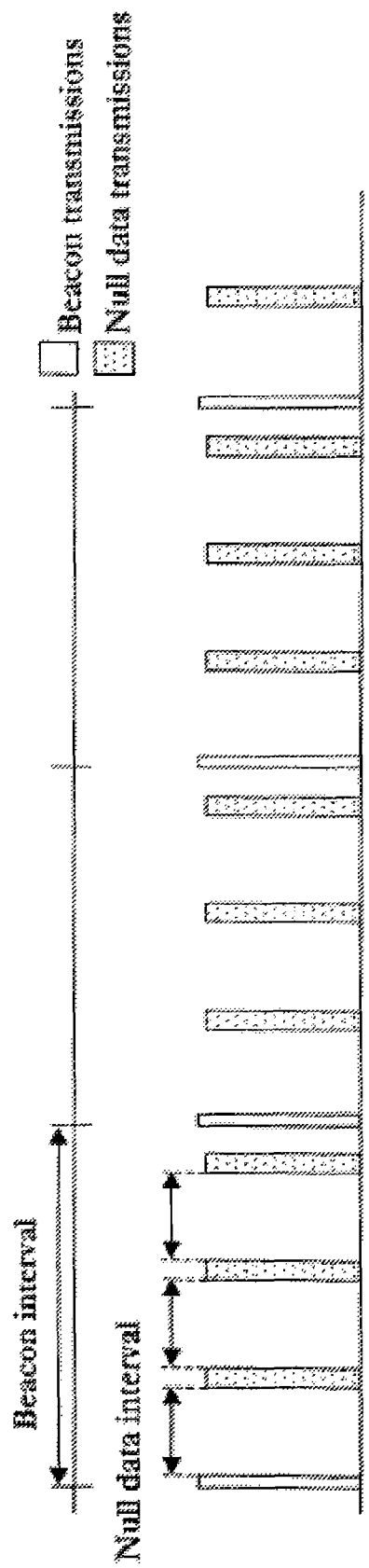
FIG. 5 is a schematic traffic time sequence on another channel according to a preferred embodiment of the present invention.

The access point 12 of the WLAN of FIG. 1, which has no mobile stations associated, only transmits beacon frames and null data frames on its allocated channel. In FIG. 5 a schematic traffic time sequence is shown for the channel allocated to the access point 12 with the present invention implemented. The beacon and null data transmissions are indicated. The channel is only quiet during the null data interval. Similarly, each other access point 13 in the WLAN transmits on its respective allocated channel null data frames according the above.

When the mobile station 18 shall connect to the WLAN, it is sufficient to set the listening time on each channel to a very low level, only slightly longer than the null data interval time, with practically no risk of missing transmissions except due to the normal hazards of wireless transmission such as interference.

It shall be appreciated that the present invention is not only applicable for reducing the time for connecting to a network, but also for reducing the time for finding available channels for a possible handoff from one channel to another.

Figure 2:
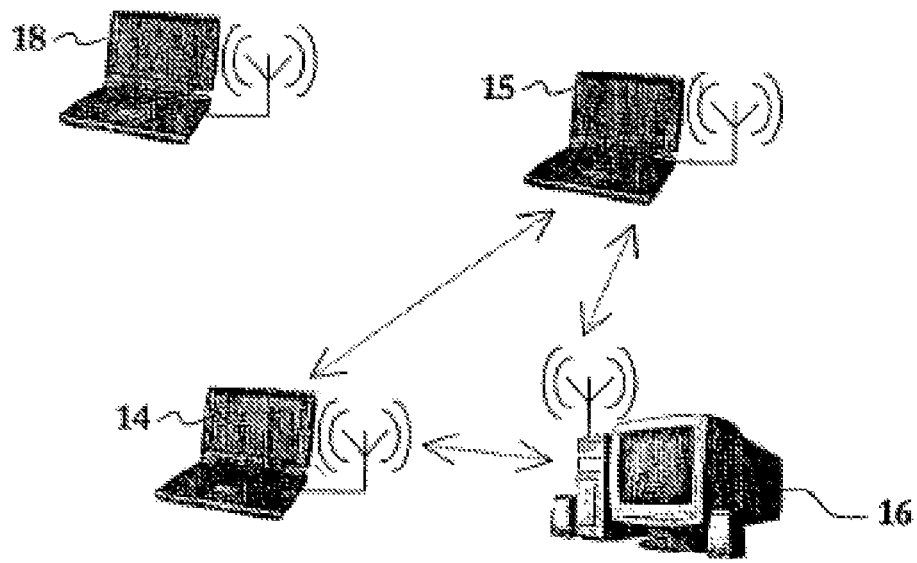
FIG. 2 is a schematic network layout for an alternative WLAN, wherein the present invention is implemented.

In FIG. 2 another network layout for a WLAN is schematically shown, wherein an alternative preferred embodiment of the present invention is implemented. This network is an ad-hook or peer-to-peer network where mobile stations 14, 15, 16 are connected direct to each other as being indicated by the bi-directional arrows, and not via any access points. One of the mobile stations 16 may transmit beacon frames regularly in order to inform surrounding units of the existence of the network.

A fourth mobile station 18 is to connect to the WLAN, and has thus to listen for data transmissions on the possible channels, and to identify the channel, on which an ongoing data transmission is detected, before being able to begin transmitting.

In this embodiment the mobile station 16 is responsible for the inventive functionality. Thus, the mobile station 16 monitors the time lapsed since last data transmission on the channel used by the mobile stations 14, 15, 16 in the ad-hook network was ended, and provided that no further data transmission on the channel occurs during a given time period since the last data transmission on the channel was ended, it transmits a null data frame on the channel. A traffic time sequence for the channel used by the ad-hook network may be similar as the one schematically illustrated in FIG. 4.

Alternatively, in an IEEE 802.11 ad-hoc network, responsibility for generating null data frames can be shared amongst all stations taking part in the network, in a similar manner to how responsibility for generating beacons is shared.

What is claimed is:

1. A method to be performed by a communication unit, comprising:
    determining a low data traffic condition on one of a plurality of communication channels, the low data traffic condition corresponding to an absence of data transmission on the one of the plurality of communication channels during a given period of time since a prior data transmission terminated on the one of the plurality of communication channels; and
    sending beacon frames on the one of the plurality of communication channels at regular time intervals, the beacon frames being sent by the communication unit, wherein the given period of time being shorter than at least one of the regular time intervals.

2. The method according to claim 1, further comprising transmitting a null data frame subsequent to determining the low data traffic condition and before the beginning of a next regular time interval.

3. A method, comprising:
    monitoring a communication channel;
    monitoring a time since a last data transmission on the communication channel terminated;
    detecting a low data traffic condition on the communication channel during a period of time since a termination of a prior data transmission on the communication channel, the low data traffic condition corresponding to an absence of data transmission on the communication channel;
    transmitting data on the communication channel;
    detecting the transmission of the data on the communication channel; and
    transmitting at least one beacon frame on the communication channel during a time interval, the time interval being longer than the period of time.

4. The method according to claim 3, wherein the communication channel is associated with a wireless local area network.

5. The method according to claim 4, wherein the communication channel is within a frequency band used for transmissions by a primary user, and wherein data may be transmitted on the communication channel only after having checked that the frequency band of said the communication is not used for transmission by said primary user.

6. The method according to claim 3, further comprising transmitting beacon frames on the communication channel approximately every 100 ms.

7. The method according to claim 3, wherein the period of time is less than or equal to 100 ms.

8. The method according to claim 3, wherein the data transmitted is comprised of a null data frame.

9. The method according to claim 3, wherein the data transmitted is sent to a broadcast address.

10. The method according to claim 3, wherein the data transmitted is sent from an access point in said communications network.

11. The method according to claim 3, wherein the data transmitted is sent from a mobile station connected in a communications network.

12. An apparatus, comprising:
    a clock to monitor a duration since a data transmission terminated;
    a transmitter to transmit data on a channel in order to enable detection of an ongoing data transmission, the transmitter to transmit the data provided that a condition of low data traffic is detected on the channel occurs during a period of time since the data transmission terminated, the low data traffic condition corresponding to an absence of data transmission on the channel, and
    send at least one beacon frame on the channels during a time interval, the period of time being shorter than the time interval.

13. The apparatus according to claim 12, wherein the channel is associated with a wireless local area network.

14. The apparatus according to claim 12, wherein the data is comprised of a null data frame.

* * * * *